(12) United States Patent
Pankaj

(10) Patent No.: US 7,106,713 B2
(45) Date of Patent: *Sep. 12, 2006

(54) METHOD OF RATE ALLOCATION IN A DATA COMMUNICATIONS NETWORK

(75) Inventor: Rajesh K. Pankaj, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 937 days.

This patent is subject to a terminal disclaimer.

(21) Appl. No.: 09/954,682

(22) Filed: Sep. 11, 2001

(65) Prior Publication Data

US 2002/0012357 A1 Jan. 31, 2002

Related U.S. Application Data

(63) Continuation of application No. 09/264,297, filed on Mar. 8, 1999, now Pat. No. 6,324,172.

(51) Int. Cl.
*H04B 7/212* (2006.01)
*H04J 3/16* (2006.01)

(52) U.S. Cl. .................. 370/336; 370/347; 370/465

(58) Field of Classification Search ............... 370/465, 370/468, 321, 329, 336, 347, 345
See application file for complete search history.

(56) References Cited

U.S. PATENT DOCUMENTS

| | | | | |
|---|---|---|---|---|
| 4,763,322 | A | | 8/1988 | Eizenhofer .................. 370/95 |
| 5,224,120 | A | | 6/1993 | Schilling ........................ 375/1 |
| 5,420,851 | A | * | 5/1995 | Seshadri et al. ............ 370/280 |
| 5,442,625 | A | * | 8/1995 | Gitlin et al. ................. 370/342 |
| 5,490,136 | A | | 2/1996 | Sereno et al. .................. 370/18 |
| 5,537,410 | A | | 7/1996 | Li ............................... 370/84 |
| 5,594,738 | A | * | 1/1997 | Crisler et al. ................ 370/347 |
| 5,598,417 | A | * | 1/1997 | Crisler et al. ................ 370/348 |
| 5,615,212 | A | * | 3/1997 | Ruszczyk et al. ............ 370/433 |
| 5,619,492 | A | | 4/1997 | Press et al. .................. 370/441 |
| 5,648,955 | A | | 7/1997 | Jensen et al. ................ 370/252 |
| 5,729,534 | A | | 3/1998 | Jokinen et al. .............. 370/280 |

(Continued)

FOREIGN PATENT DOCUMENTS

EP 0844800 5/1998

(Continued)

OTHER PUBLICATIONS

Comer D. E. et al.: "A Rate-Based Congestion Avoidance and Control Scheme for Packet Switched Networks," Proceedings of the International Conference on Distributed Computing Systems, US, Los Alamitos, IEEE Comp. Soc. Press, (1990).

*Primary Examiner*—Andrew C. Lee
(74) *Attorney, Agent, or Firm*—Philip Wadsworth; Sandra L. Godsey; Abdollah Katbab

(57) ABSTRACT

A novel method is disclosed for the allocation of the capacity of a common channel among a number of data producers. In this method, a producer's future allocation grant is based on the extent to which the producer has used a previous allocation grant. The method is applicable to any system wherein the simultaneous use of a common channel by more than one producer may cause a data collision, and an exemplary application to the reverse link of a CDMA telecommunications system is described. Also disclosed are numerous variations and refinements concerning the estimation of remaining channel capacity, the distribution of such capacity among the various producers, and the use of its allocation grant by each producer.

23 Claims, 17 Drawing Sheets

U.S. PATENT DOCUMENTS

| | | | |
|---|---|---|---|
| 5,734,646 A | 3/1998 | I et al. | 370/335 |
| 5,857,147 A | 1/1999 | Gardner et al. | |
| 6,002,690 A * | 12/1999 | Takayama et al. | 370/437 |
| 6,128,500 A * | 10/2000 | Raghavan et al. | 455/453 |
| 6,266,330 B1 * | 7/2001 | Jokinen et al. | 370/329 |
| 6,324,172 B1 * | 11/2001 | Pankaj | 370/342 |
| 6,324,184 B1 * | 11/2001 | Hou et al. | 370/468 |
| 6,721,278 B1 * | 4/2004 | Rimhagen et al. | 370/252 |
| 6,882,841 B1 * | 4/2005 | Youn | 455/434 |

FOREIGN PATENT DOCUMENTS

| | | |
|---|---|---|
| WO | 9401975 | 1/1994 |
| WO | 9507578 | 3/1995 |
| WO | 9610305 | 4/1996 |
| WO | 9637081 | 11/1996 |
| WO | 9700565 | 1/1997 |
| WO | 9746044 | 12/1997 |

* cited by examiner

US 7,106,713 B2

METHOD OF RATE ALLOCATION IN A DATA COMMUNICATIONS NETWORK

CLAIM OF PRIORITY UNDER 35 U.S.C. §120

The present Application for Patent is a Continuation and claims priority to U.S. Ser. No. 09/264,297, filed Mar. 8, 1999, now U.S. Pat. No. 6,324,172, entitled "Method Of Rate Allocation In A Data Communications Network," issued Nov. 27, 2001, and assigned to the assignee hereof and hereby expressly incorporated by reference herein.

BACKGROUND OF THE INVENTION

1. Field of the Invention

This invention relates to networks for data communications. More specifically, this invention relates to the allocation of transmission rates among the producers in a data communications network. More specifically, this invention relates to the allocation of transmission rates on the reverse link of a wireless data communications network.

2. Description of Related Art and General Background

Channel capacity, a basic limitation of any system for data communications, may be defined as the rate at which information can be passed from one end of a transmission channel to the other, given some mode of transmission and some performance criteria (e.g., binary phase-shift keying modulation of a 1.9-GHz RF carrier using polar NRZ signaling, with a bit-error rate of $10^{-5}$). The rate at which information may be transferred from one point to another cannot exceed the ability of the particular method and medium of transmission to convey that information intelligibly. It follows that the rate at which a data producer outputs data into a transmission channel cannot exceed the channel capacity, commonly measured in units of information per units of time (e.g., Kbits/s).

Digital data are commonly transmitted in frames of predetermined length. In order to allow for error detection, it is also common to calculate and transmit a checksum along with each frame, so that the data may be verified by the receiver. This checksum is typically in the form of a cyclic redundancy check (CRC) value computed with a polynomial algorithm known to both the receiver and the transmitter. If the data in the received frame do not match the received checksum, the frame is rejected and must be re-transmitted or compensated for in another manner.

Two or more producers may wish to transmit information over the same channel. If, for example, the producers are also physically separated, then their transmissions may not be coordinated with each other. A data collision occurs when the several transmissions arrive at the consumer having together exceeded the available channel capacity. (Note that in a time-division multiple-access or TDMA wireless system, the channel capacity available to any producer may change over time as a function of the number of producers using the same frequency channel, in that the available capacity will be zero during any period when another producer is using the channel.) Such a collision causes all of the frames being transmitted to become irretrievably corrupted, no matter how complete their transmissions were to that point. If re-transmission is required (i.e., if the system cannot otherwise compensate for the loss of data), then the producers must re-send these frames in their entirety. Therefore, one may clearly see that data collisions directly and dramatically reduce the effective channel capacity.

When the sum of the producers' output rates may exceed the channel capacity, then the producers are competing for the same limited resource and some method of allocating the channel capacity among them becomes necessary. Such allocation methods may be static, dynamic, or some combination of the two.

Static allocation schemes are best suited for situations where the data producers' outputs remain relatively constant over time: in systems for voice transmission, for example. (We will assume here that the capacity of the channel itself remains relatively constant.) One characteristic of static allocation schemes is that they may be applied in a similar fashion to either wired or wireless networks. For example, several digitized voice signals may be time-division multiplexed over a single copper or fiber optic cable, or a number of analog voice signals may be time- and/or frequency-division multiplexed over the same radio frequency band, or several digitized voice signals may share the same radio frequency band at the same time by using code-division multiple access techniques.

Alternatively, the rates of data production may vary significantly from one moment to the next; i.e., the data traffic may be bursty. Traffic on high speed networks for data communications, for example, tends to be bursty. Static allocation techniques are not well suited for such environments. On one hand, data transmission applications are usually more tolerant of delays than voice transmission applications, so a producer will not usually require the regulated level of access to the channel which a static scheme provides. On the other hand, while backlogged and therefore outdated voice information may simply be discarded by the producer before transmission, discarding data information whose transmission has been delayed is not usually a viable option. Therefore, if a producer's store of data information should begin to accumulate faster than its buffering capacity can handle, the producer will temporarily need to use more of the channel capacity than it has been assigned. Even if other producers are currently idle, however, and plenty of channel capacity is presently available, a static scheme will not accommodate the temporary redistribution of capacity needed in this situation.

Suppose that a channel has a capacity of 200 Kbits/s; there are four producers A, B, C, and D, each having a maximum output rate of 200 Kbits/s; and 50 Kbits/s of the capacity as statically allocated to each producer. If each producer produces a steady stream of data at the allocated rate of 50 Kbits/s, then the allocation scheme may be said to be optimal. However, if instead, the traffic is bursty, with A having a packet of 50 Kbits to output at time 0.25 s, B and C each having a packet of 50 Kbits to output at time 0.5 s, and D having a packet of 50 Kbits to output at time 0.75 s. As shown in FIG. 1, 1 second is required for each producer to complete its transmission under the static scheme described above, even though it would take only 0.25 second if the producer were allowed to operate at its maximum output rate. It is notable that using a static allocation scheme in this bursty environment also causes much of the channel capacity to remain unused.

Now consider FIG. 2, in which channel capacity is allocated dynamically according to each producer's ability to use the channel during any given quarter-second. At time 0, only producer A has data to transmit. Therefore, we allocate the entire channel capacity of 200 Kbits/s to producer A, and it completes its task in 0.25 s, for a 75% savings over the static allocation scheme. At time 0.5 s, producers B and C each have data to transmit, so we allocate 50% of the channel capacity to each one, and they complete their tasks in 0.5 s, for a savings of 50%. (Note that a more optimal scheme would allow either B or C to use the entire channel, completing transmission in 0.25 s. The other producer would still complete in 0.5 s, using the entire channel between times 0.75 and 1.0 s.)

At time 0.75 s, producer D has also data to transmit. We will assume that the scheme requires D to wait until producers B and C have finished, so that D begins transmission at 200 Kbits/s at time 1.0 s and finishes at 1.25 s, for a savings of 50%. Therefore, it is clear that in this bursty environment dynamic allocation can achieve an average savings in time with respect to each producer of greater than 50%.

As noted above, we have assumed that the capacity of the channel remains relatively constant. This assumption will not always hold in the real world, especially in cases where the channel is wireless. When the total capacity drops, a system that is using the full capacity of the channel under a purely static scheme will fail. A dynamic scheme, on the other hand, can usually be adapted to base its allocations on an updated report of the total capacity rather than on some fixed value.

For all of their advantages, however, dynamic allocation schemes may be much more complicated to implement than static ones. In static allocation, a fixed set of rules is developed and applied, and the only task during operation is to ensure compliance with these rules. In dynamic allocation, on the other hand, the rules must adapt continually to match a changing environment. An implicit requirement for a dynamic scheme, therefore, is a way for the allocation mechanism to acquire knowledge about the environment: i.e., which of the producers has data to transmit, and how much.

Note that in the discussion of FIG. 2 above, we have assumed that the allocation mechanism has perfect knowledge of when each producer has data to transmit and how much data it has to transmit. In many applications, however, it may not be possible for the allocation mechanism to obtain or otherwise determine any of this information directly. We have also assumed that the amount of data that each producer has to transmit is not changing, and that each producer has enough power to transmit at the allocated rate. In many situations, one or both of these assumptions may not hold.

Also note that under a static allocation scheme, data collisions cannot occur, assuming that the actual channel capacity does not decrease and that the rules are chosen so that the sum of all allocated rates does not exceed that capacity. In dynamic schemes, however, the rules are based on a necessarily imperfect model of the future behavior of the producers. Collisions become possible, and this possibility must be considered in any evaluation of dynamic allocation schemes.

Mainly because of the requirement for knowledge of the environment, implementations of dynamic allocation schemes on wired links differ significantly from implementations on wireless links. In a wired service such as Ethernet, for example, the producers can monitor the channel at the same time they are transmitting over it; no particular problem is caused by creating voltage fluctuations on a wire on one hand, and monitoring the voltage fluctuations on that wire on the other hand. This immediate availability of feedback information to all users of a wire channel allows for distributed control of the channel. Not only can each producer listen to the channel before transmission to make sure it is clear, but the producer can also monitor its own ongoing transmission to make sure that it is not colliding with a simultaneous transmission by another producer. When a collision occurs, the relevant producers know about it and can react without delay.

In wireless systems, however, simultaneous transmission and reception over the same channel is not commonly implemented. One reason is the significant problem of monitoring the channel for remote activity being masked by a simultaneous and much stronger local signal. Even if this difficulty is overcome, however, it may still be impossible for a producer to determine when a collision has occurred at the consumer.

In one simple example, the signals of two producers may collide at the consumer, but be prevented from reaching each other. Detecting no conflict, each producer will believe that its transmission was successful, when in fact no data was actually received by the consumer. This example illustrates the problem that in a wireless system, the producers typically have no direct way to obtain meaningful feedback information concerning current channel use. Such information can typically only be obtained indirectly from a unit at the other end of the channel. Consequently, data collisions caused by channel overuse become more costly in a wireless network because of the feedback delay.

One conventional approach to dynamic allocation in wireless networks is the well-known ALOHA scheme. In ALOHA, transmissions are divided into frames, and any producer may transmit a data frame at any time. If the frame is acknowledged by the channel control unit, then the producer assumes that it was transferred successfully. If the frame is not acknowledged, then the producer assumes that it collided with a transmission by another producer, and it re-transmits the frame at a future time according to some delay protocol.

Unfortunately, ALOHA is extremely susceptible to data collisions, and it can be demonstrated that the maximum channel utilization for a pure ALOHA scheme is only 18%. An improved version, called slotted ALOHA, requires transmissions to be initiated only on slot boundaries, where the time between adjacent slot boundaries corresponds to the time required to transmit one frame. Slotted ALOHA thus doubles the maximum utilization to 37% by reducing the collision interval from two slots to only one. However, over 60% of the channel capacity is still lost due to collision or inactivity. (In this case, 37% of the slots are used for successful transmissions, 37% remain idle, and 26% are lost to collisions. Trying to reduce the number of idle slots increases the rate of collision and thus reduces the number of successful transmissions).

Another type of dynamic allocation scheme is the request-grant method, several variations of which exist in practice. In a request-grant system, each producer transmits a request for a certain portion of the channel capacity, and a control unit considers the various requests and transmits allocation grants back to the producers.

One problem with using a request-grant system is that a producer may not know in advance how much of the channel capacity it will need. Consider a producer made up of a buffer memory unit connected to a wireless telephone through, e.g., a PCMCIA interface. Ideally, the telephone will remain off-the-air until the buffer is full, at which time it will request permission to transmit the contents of the buffer at maximum rate in a single burst. Unfortunately, unless the buffer unit and the telephone are purchased as a single device, the capacity of the buffer will generally not be known to the telephone. Also, there may be an additional store of data ready for transmission and waiting on the other side of the buffer. Therefore, the telephone typically will not know how much data is actually available for transmission, and consequently it will not know what rate to request.

Other problems associated with request-grant systems are the extra traffic required to send the requests (which necessarily reduces the available channel capacity) and the delays incurred in waiting for requests to be received, processed, and acknowledged. Transmission over a common channel is also susceptible to the abrupt changes in channel quality that may occur when another producer suddenly begins to use a large allocation grant.

SUMMARY OF THE INVENTION

A novel method is disclosed for the efficient allocation of the capacity of a common channel among a set of data producers. In this method, a control unit issues an allocation grant (i.e., a maximum permissible transmission rate) to each producer which is based on the extent to which that producer has used a previous allocation grant. The method is applicable to any system wherein the simultaneous use of a common channel by more than one producer may cause a data collision. Several variations of the method, using alternate methods of capacity estimation and distribution, are also disclosed.

DETAILED DESCRIPTION OF THE INVENTION

Figure 1:
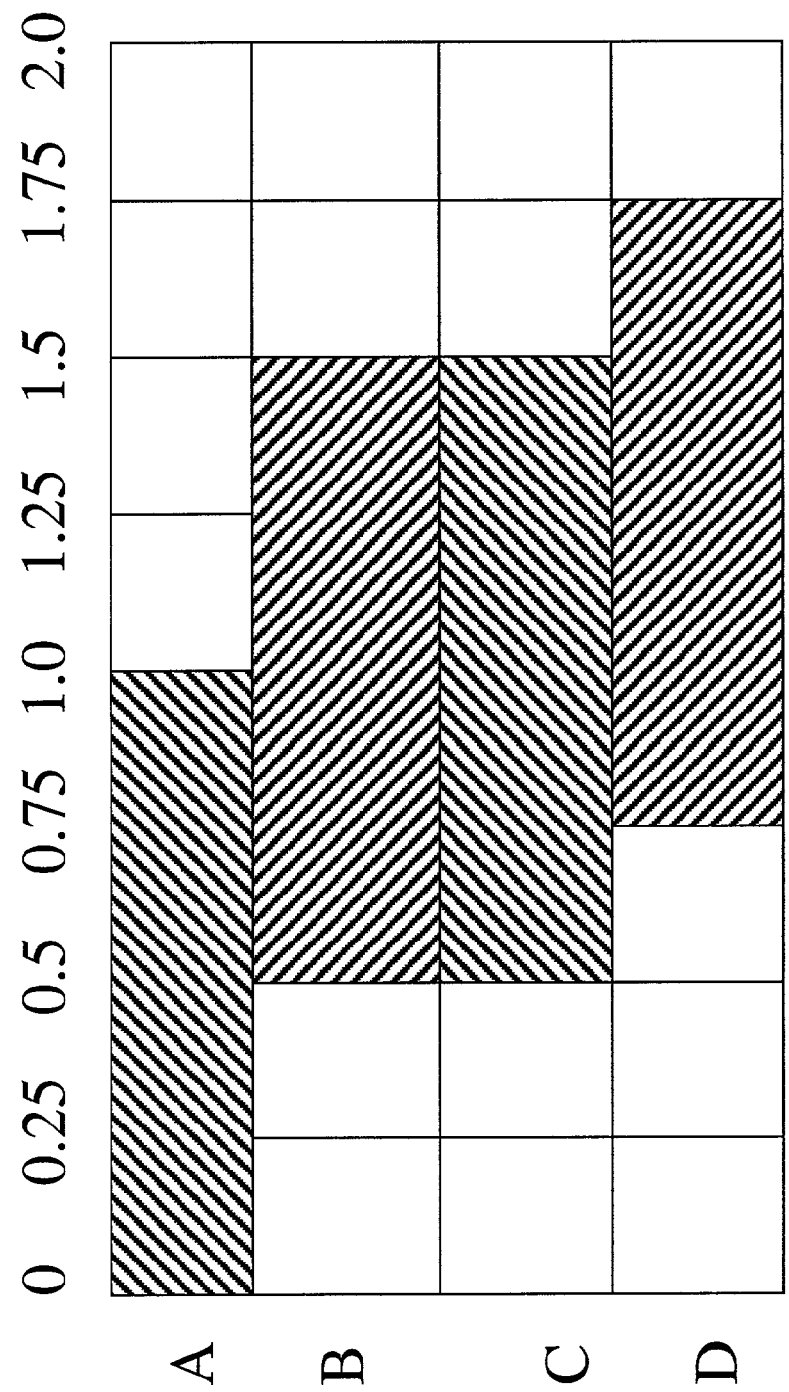
FIG. 1 is a block diagram illustrating a static allocation.
Figure 2:
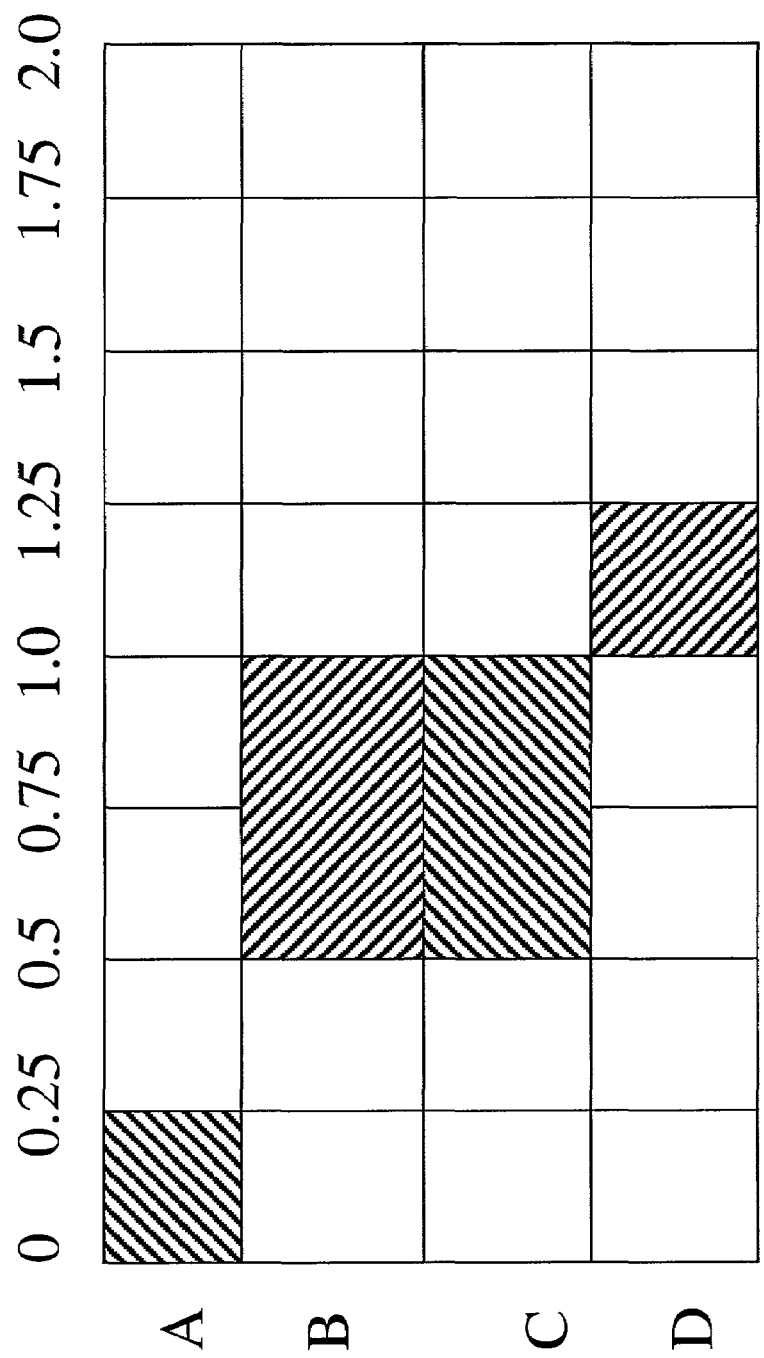
FIG. 2 is a block diagram illustrating a dynamic allocation.
Figure 3:
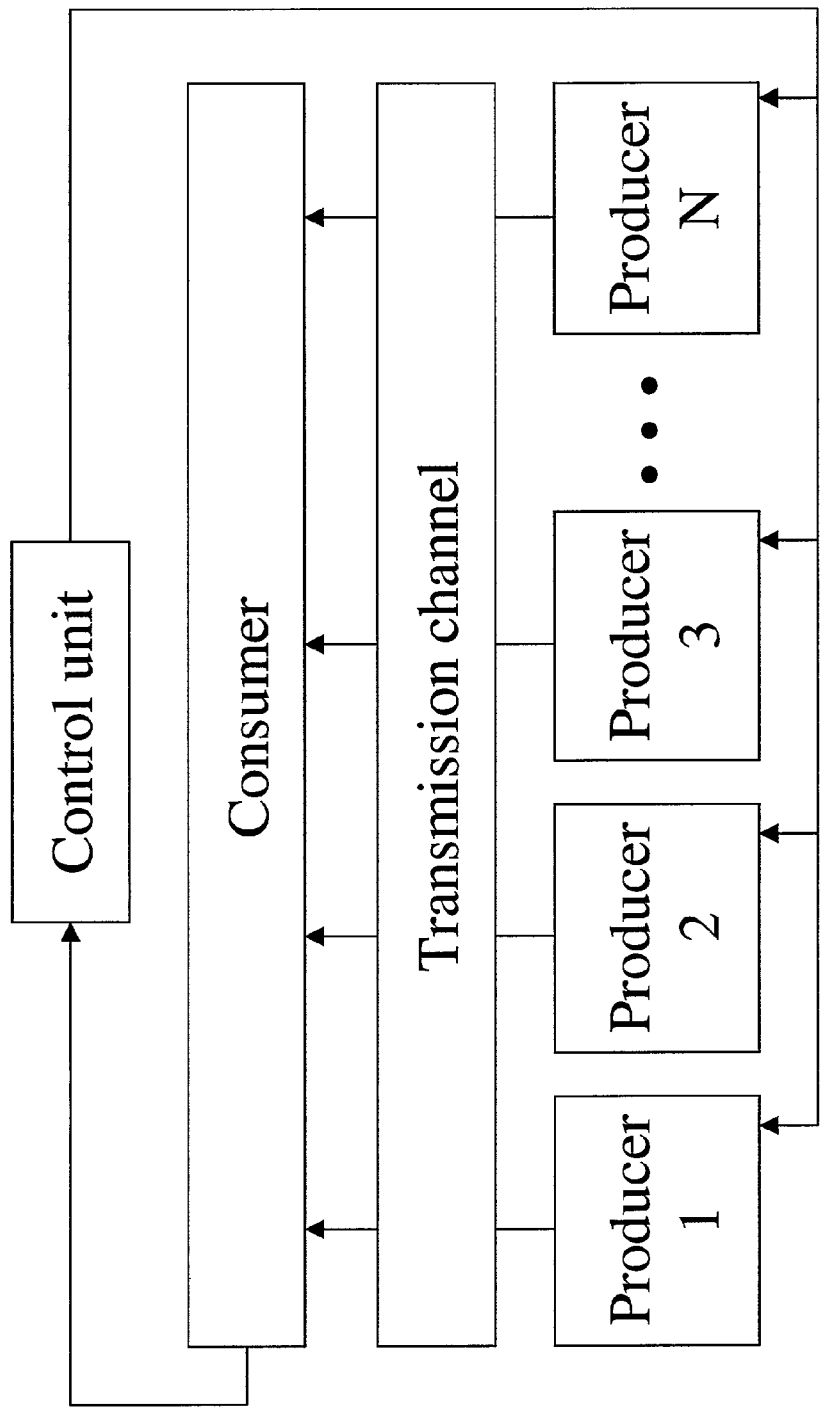
FIG. 3 is a block diagram showing a system having a number of data producers sharing a common transmission channel.

The novel method disclosed herein supposes a system having a number of data producers, a common transmission channel, and a control unit which issues allocation grants to the data producers, an example of which is shown in FIG. 3. In order to issue appropriate allocation grants, the control unit must know 1) the total capacity of the channel, 2) the approximate number of producers, and 3) something of the history of the individual producers' uses of previous allocation grants. The method assumes that a suitable value or estimate for the present capacity of the channel is already available.

Although this method may be implemented in any system that fits the model of FIG. 3, an exemplary application is on the reverse link of a CDMA telecommunications system. Each producer in such a system may comprise 1) a transmitter, such as a mobile telephone or a WLL (wireless local loop) station, connected to 2) a data-producing device, such as a laptop computer or a point-of-sale terminal, through a PCMCIA card or a similar interface, and outputting data encapsulated in packets under TCP or any other suitable protocol. Several generations and versions of CDMA telecommunications systems have already been implemented and are known in the art. While most of these CDMA systems have been designed to carry digitized voice communications, however, the method herein described is better suited to a network serving producers with widely varying transmission rates, such as a data-only network or a mixed voice-data network.

Estimation of Capacity Available for Allocation

In order to avoid the delays associated with, e.g., a request-grant system, we normally allow each of the known producers to transmit at least at some basic rate, even if no explicit allocation grant has been issued to that producer and whether or not it has previously been active. So that data collisions may be avoided, this basic rate would usually be chosen to be no more than the total channel capacity divided by the number of producers (note again that we assume that the actual channel capacity does not drop below a predetermined level).

Figure 4:
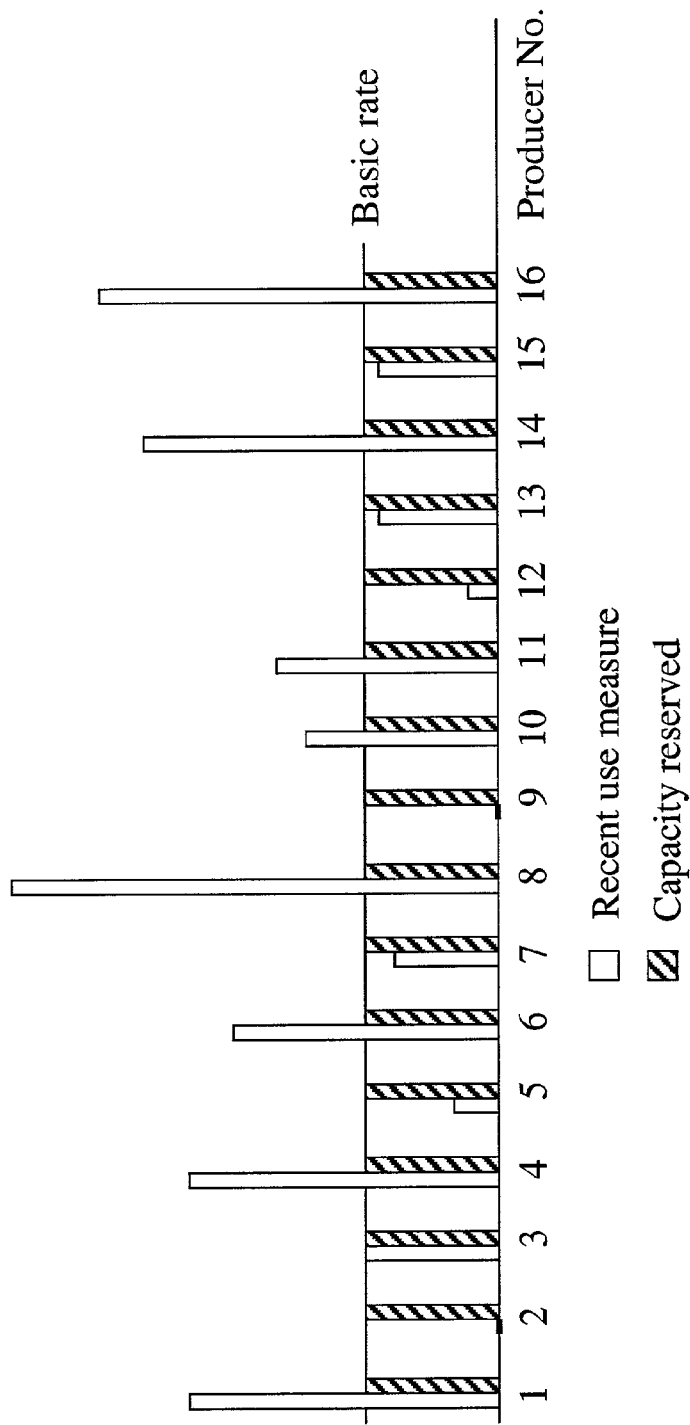
FIG. 4 is a graphic illustration of a limit-based capacity estimation scheme.

The first step in the allocation process is for the control unit to reserve some minimum portion of the channel capacity for each producer. Under a 'limit-based' scheme, the basic rate is reserved for each producer, regardless of that producer's recent level of activity. That part of the channel capacity which remains is then distributed into allocation grants according to the producers' recent levels of activity as described below. An example of a limit-based scheme which has the advantage of avoiding the possibility of data collisions is illustrated in FIG. 4.

Figure 5:
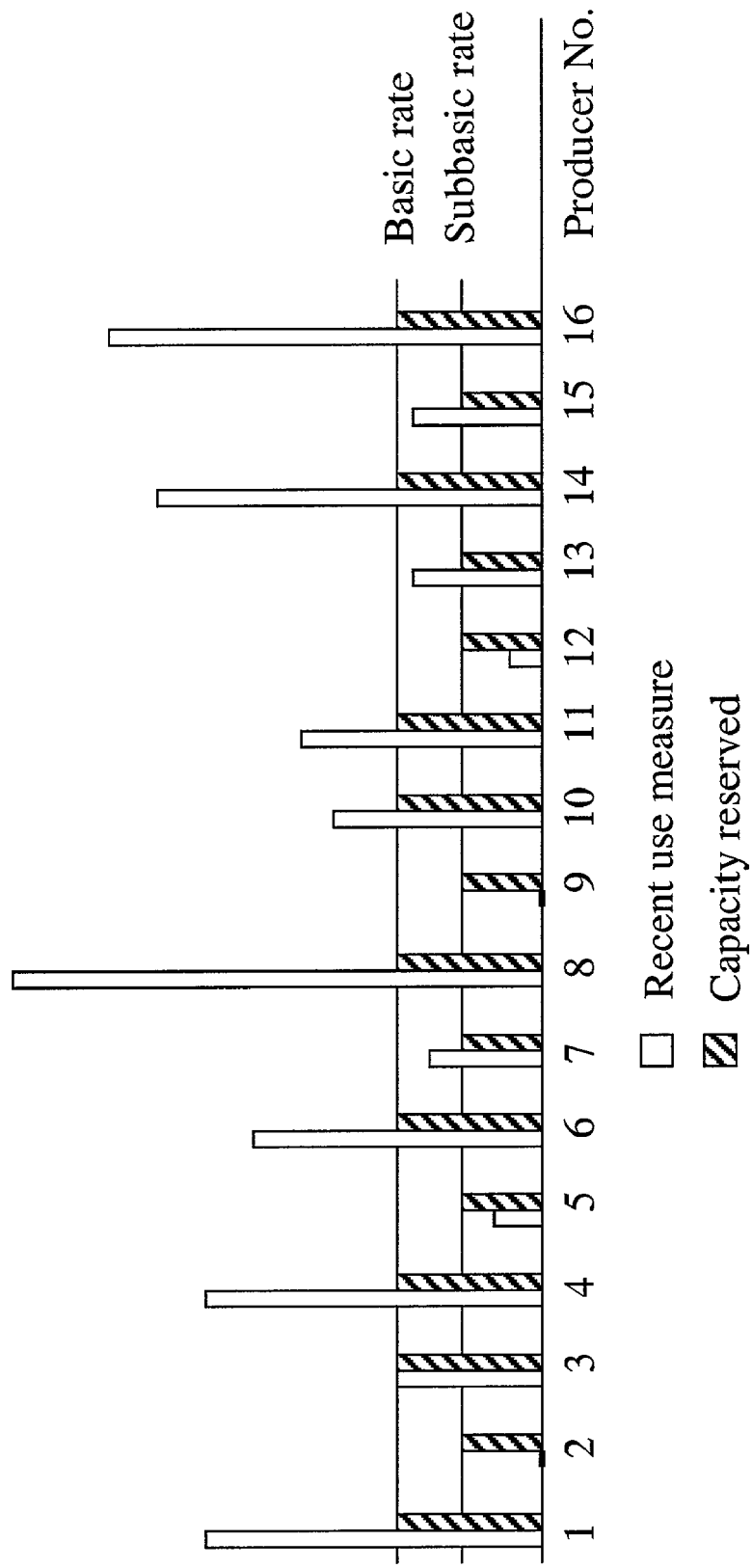
FIG. 5 is a graphic illustration of a current-use-based capacity estimation scheme.
Figure 6:
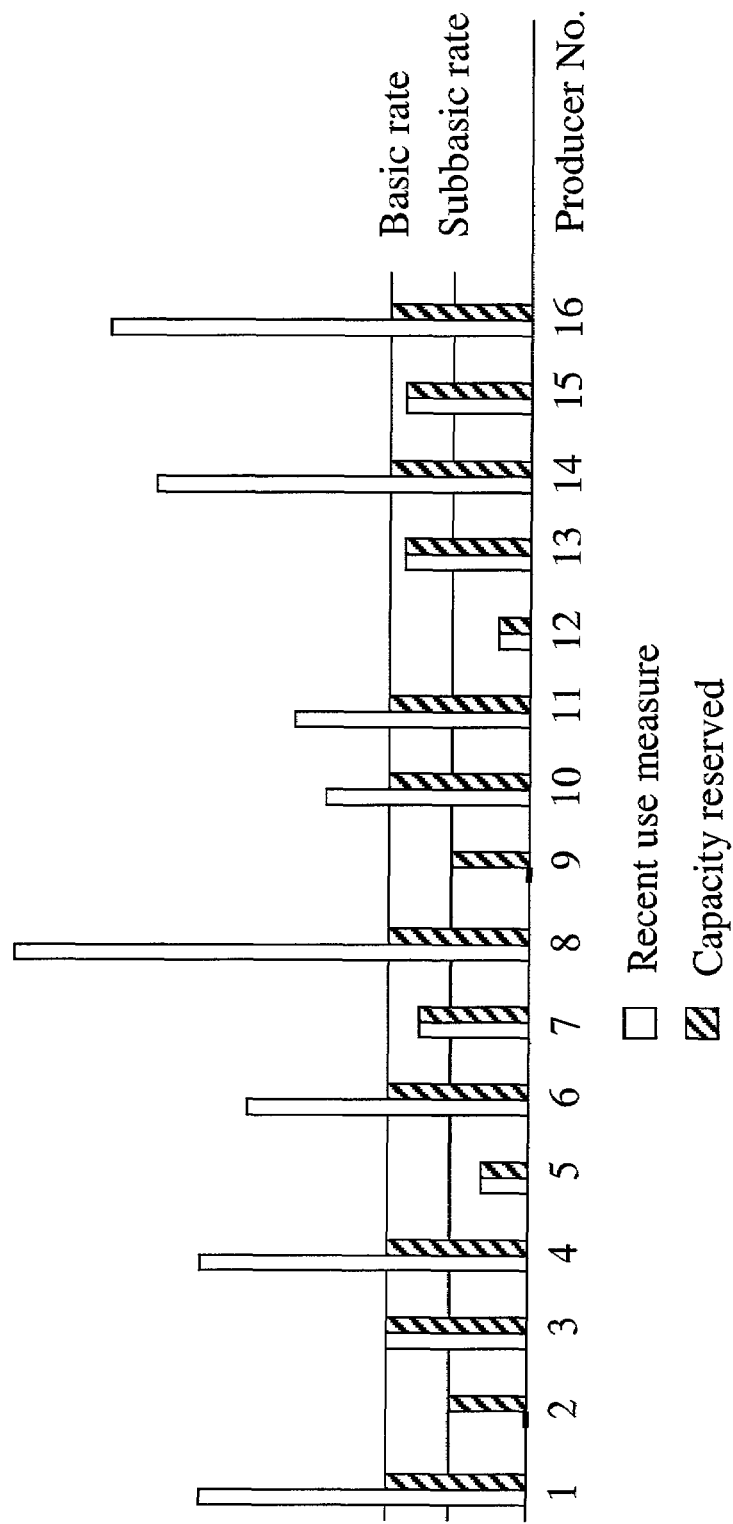
FIG. 6 is a graphic illustration of another current-use-based capacity estimation scheme.

Alternatively, the remaining channel capacity may be estimated using a 'current-use-based' scheme instead, such as illustrated in FIG. 5. Under this scheme, the basic rate is reserved only for those producers currently using at least that rate. For other producers, a rate less than the basic rate is reserved. One possibility shown in FIG. 5 is that for each producer not currently active or currently using less than the basic rate, only a sub-basic rate is reserved. In another variation, illustrated in FIG. 6, only the actual rate being used is reserved for each producer who is active but currently using less than the basic rate. Note that although the capacity reserved for some producers is lower than the basic rate, all producers are permitted to transmit at the basic rate. Therefore, while a current-use-based scheme results in a higher estimate of the remaining capacity, it also introduces the possibility of data collisions.

Figure 7:
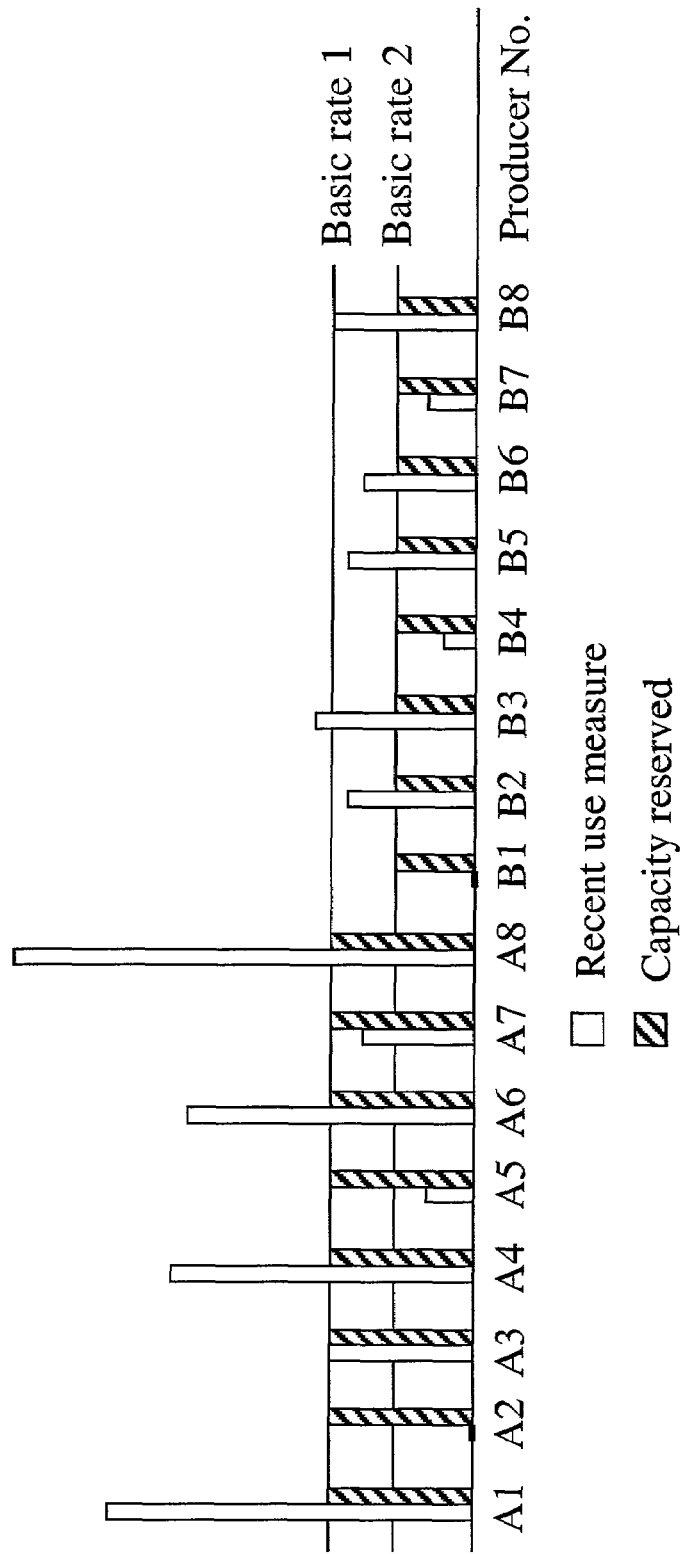
FIG. 7 is a graphic illustration of a capacity estimation scheme for a system having different basic rates for different producers.

Either of these schemes may be further modified by incorporating distinctions between various groups of producers. For example, some identifiable group of producers may be expected to use a lower rate on average than other producers, whether because these producers are unable to produce and/or transmit data above a certain rate, or because the particular application in which they are used is generally less transmission-intensive (e.g., POS terminals). In such cases, as illustrated in FIG. 7, different basic rates may be used in reserving channel capacity for different producers.

In some situations, it may be possible for new producers to arrive after the allocation grants have already been distributed. The capacity estimation scheme may therefore also be modified to reserve channel capacity for such new arrivals. Without such allowance, a new producer must either suffer a delay waiting to receive an explicit allocation, or may begin transmitting into a fully allocated channel and thereby increase the probability of a data collision.

Allocation of Available Capacity

If it is determined that a producer is not using all of its allocation grant, then we may assume that the producer is out of data for the moment and is therefore less likely to require an allocation grant above the basic rate at this time. After estimating how much channel capacity is available for distribution, the control unit generates an 'eligibility list' identifying those producers who have used all of their previous allocation grants and are therefore eligible to receive allocation grants beyond the basic rate. In determining usage history, it is preferable to consider only the most recent transmissions; it is also preferable to choose the highest transmission rate among them in order to account for the possibility of lost or corrupted transmissions.

Figure 8:
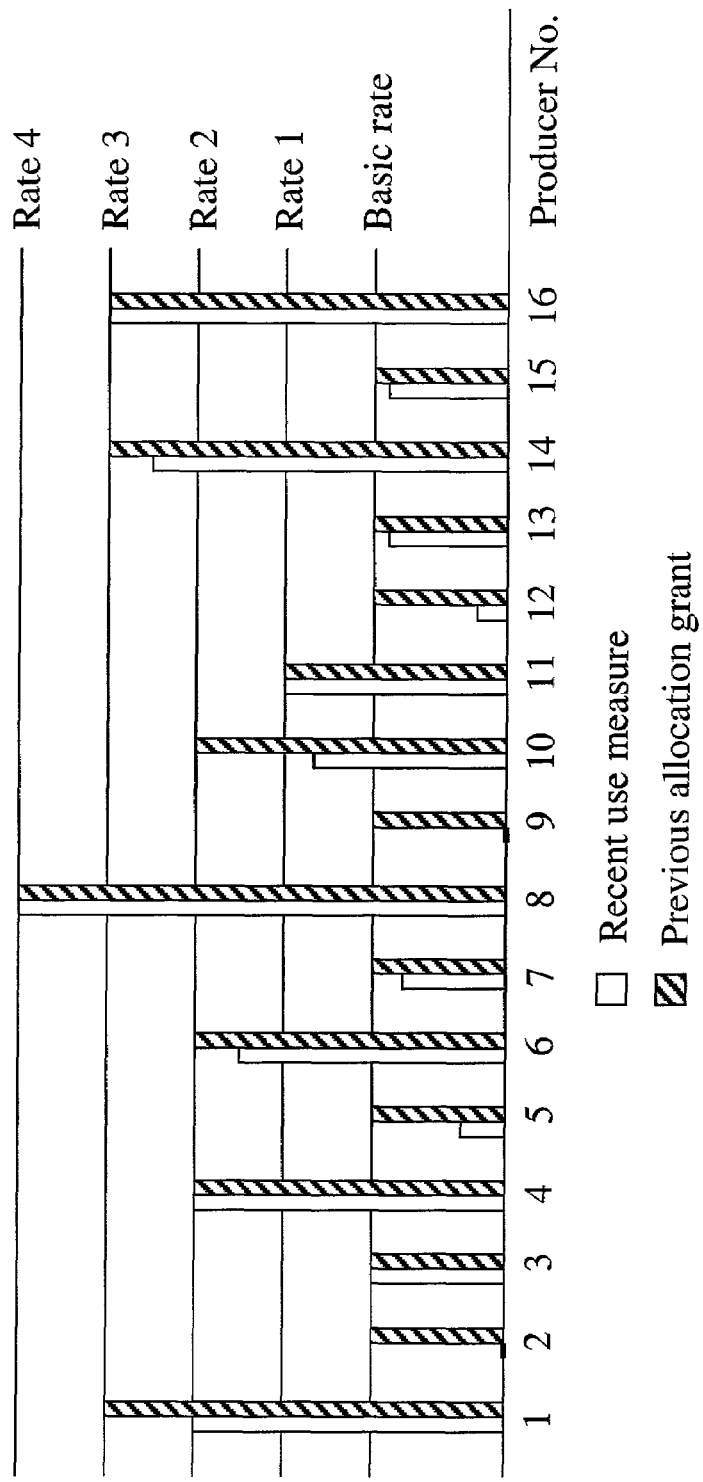
FIG. 8 is a graphic illustration of parameters from which an eligibility list may be constructed.
Figure 9:
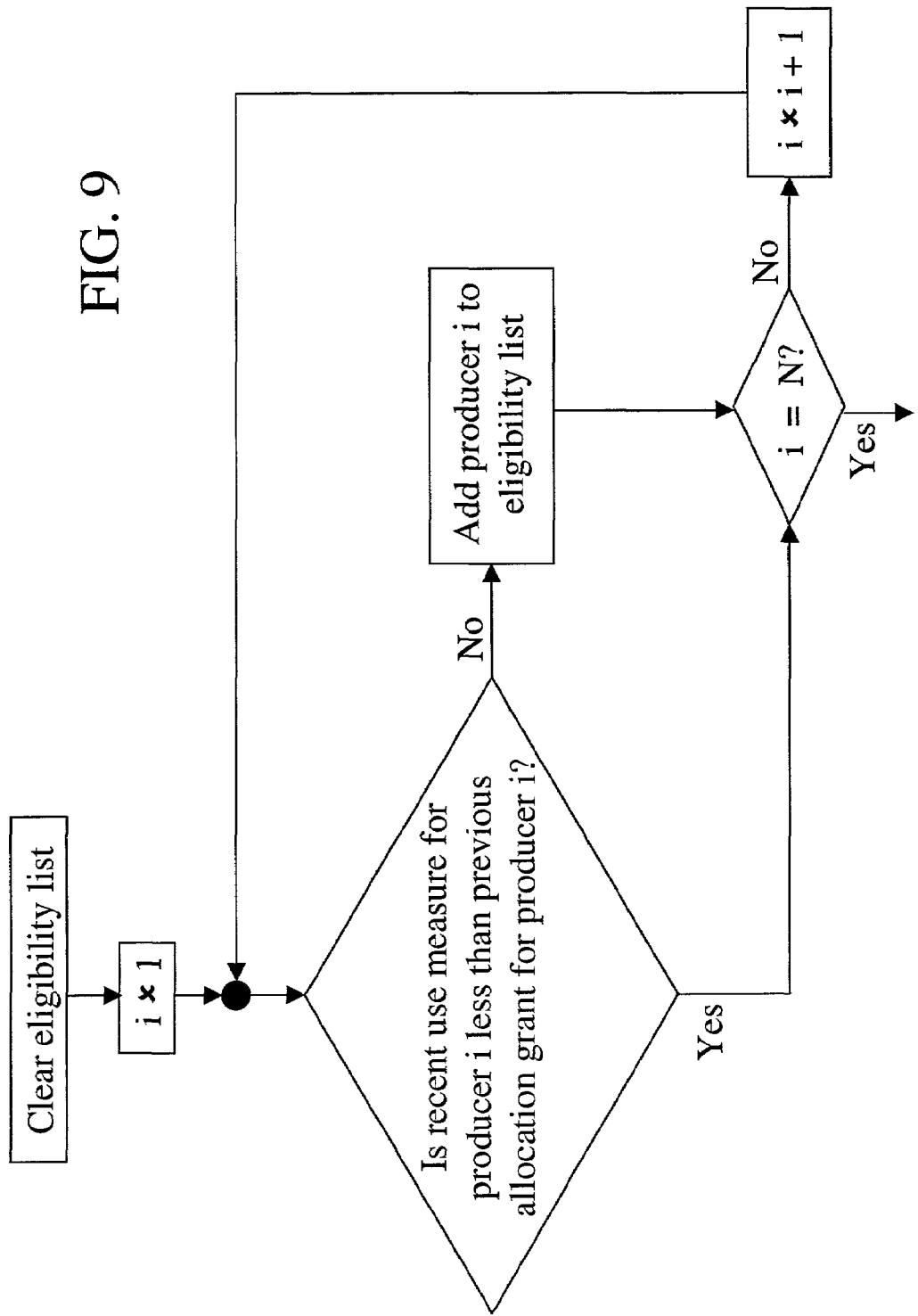
FIG. 9 is a flowchart for a method for generating an eligibility list.

FIG. 8 shows an example of the data from which an eligibility list may be generated. In this example, the eligibility list would include producers Nos. 3, 4, 8, 11, and 16. FIG. 9 shows one method by which an eligibility list may be generated.

Figure 10:
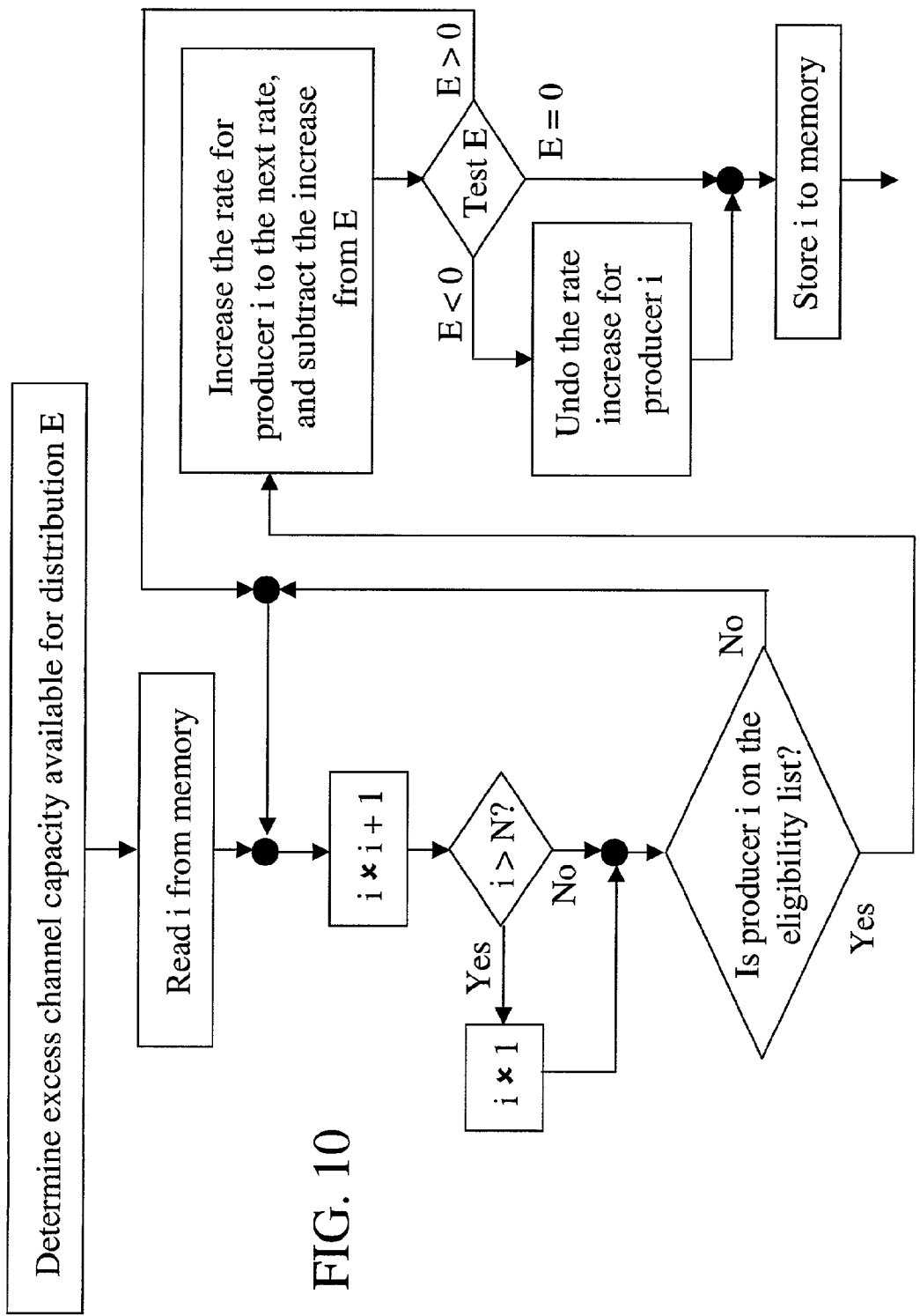
FIG. 10 is a flowchart for an equitable sharing method.

Once the control unit has generated the eligibility list, it distributes the remaining channel capacity by increasing the allocation grants that will be sent at least to the eligible producers. The distribution may be performed according to a number of different variations such as the following:

Under an 'equitable sharing' method, the allocation grant for each eligible producer is increased to the next rate, beginning with the first producer on the list. This process continues in a round-robin fashion until all of the available capacity has been distributed. At the next allocation cycle, the process begins with the producer next in line when the previous cycle ended. FIG. 10 shows one way to implement an equitable sharing method.

Under a 'modified equitable sharing' method, every producer is included in the eligibility list. Those producers who were active but using less than their allocated rates, however, are allocated rates no higher than the rates they were actually using.

Under a 'winner-takes-all' method, each eligible producer in order is allocated the highest possible rate without exhausting the available capacity. In the next allocation cycle, the producer who was first in the previous cycle is moved to the bottom of the list.

Any such method can be further modified by granting a priority to certain producers, whether by modifying the list order or increment amount or by some other preference. Such priority may be granted based on the nature of the producer or its application or, in the alternative, on a difference in customer pricing schemes.

It is possible that available channel capacity may remain even after the eligibility list has been processed. In this case the remaining capacity may be distributed, for example, among the ineligible producers or, alternatively, among the entire set of those producers who have not already been allocated the maximum possible rate. Under another alternative, the remaining capacity is distributed among the producers who otherwise would be allocated only the basic rate. This latter scheme prevents higher-rate producers from being penalized back to the basic rate as a result of receiving a higher allocation grant than they can use.

Figure 11:
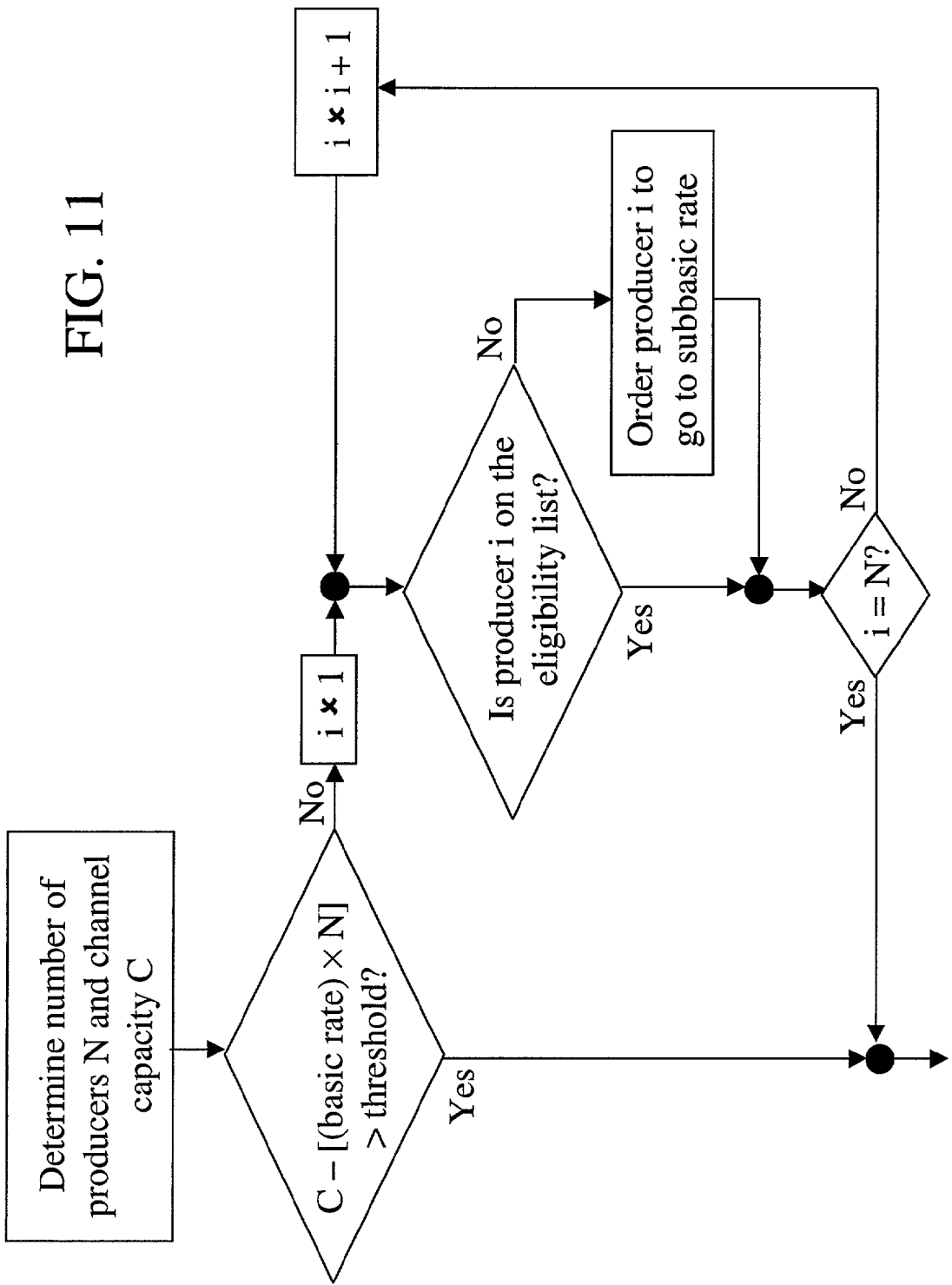
FIG. 11 is a flowchart for a method for handling a potential overload situation.

Adjustment of the basic rate may occur every time that allocation grants are made, or less frequently (e.g., every time the number of producers changes), or even not at all (e.g., some constant value may be adopted as part of the system design). If basic rate adjustment occurs infrequently or not at all, then it is possible for a 'potential overload' situation to arise. A potential overload situation is one in which channel capacity would be exceeded if all producers transmitted at the basic rate. In cases where the control unit knows the number of producers, it is possible to foresee such a situation. One way for the control unit to handle a potential overload situation would be to temporarily allocate a sub-basic rate or even a null rate to some predetermined group of producers, or to all or some portion of the ineligible or low-priority producers. An example of such a method is illustrated in FIG. 11. Such action would free up capacity for the other producers by effectively quieting or even silencing this group for some period of time.

Issuance of Allocation Grants

Figure 12:
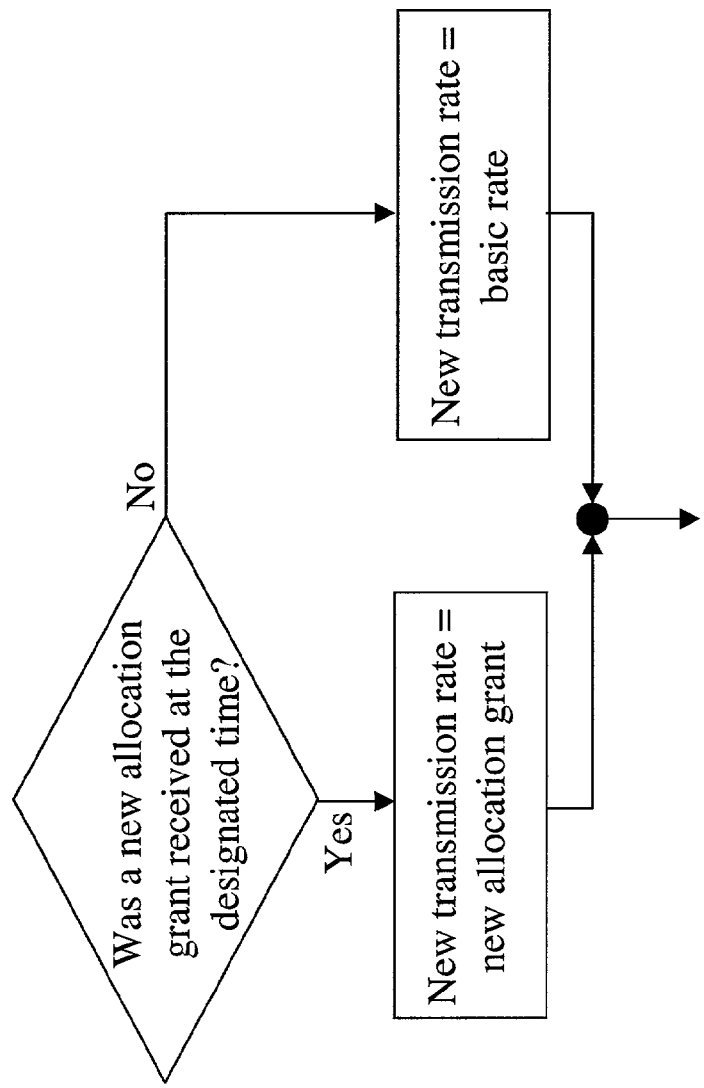
FIG. 12 is a flowchart for a method for receiving a new allocation grant.
Figure 13:
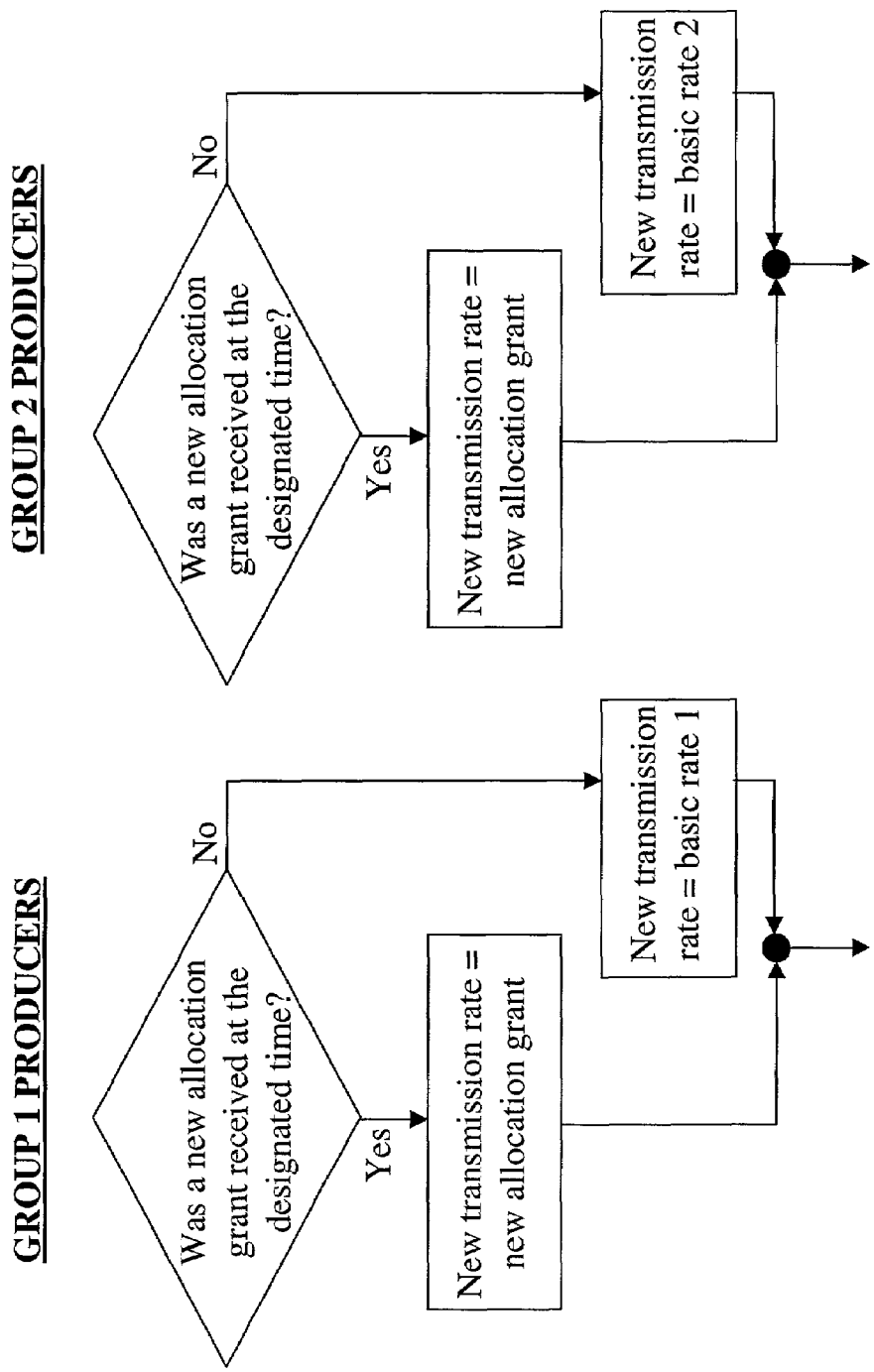
FIG. 13 is a flowchart for a method for receiving a new allocation grant, wherein the producers are divided into two groups.

When the control unit has completed the new allocation grants, it is ready to transmit them to the corresponding producers. Allocation grants need only be transmitted to those producers whose new grants are different than the basic rate. It is preferred to transmit all of the allocation grants periodically and simultaneously via an update signal whose timing is known to the producers. The time between updates should be short enough to reflect changing conditions but not so frequent to disrupt channel activity. In an exemplary application, updates are issued every 400 or 800 ms. If a producer does not receive a new allocation grant at the time when the update signal is due, then it knows that it cannot transmit at a rate above the basic rate at least until the next update signal is due. One method of allocation grant reception is illustrated in FIG. 12, and a variation that accounts for two different groups of producers is shown in FIG. 13.

Use of Allocation Grants

Figure 14:
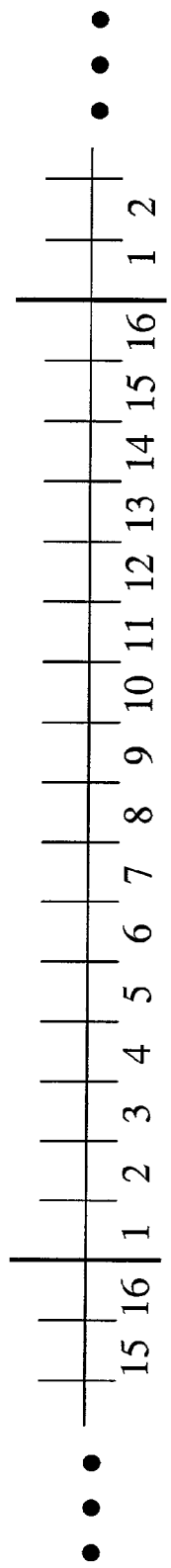
FIG. 14 is an illustration of time being divided into frames, each frame having 16 slots.

Once the allocation grants are issued by the control unit, control passes to the individual producers. In order to minimize variations in channel quality and thus reduce the possibility of data collisions, it is preferable for each producer to wait to increase its rate until all issued decreases have been implemented, and it is also preferable that different producers implement their rate increases at different times. These conditions are implemented in an exemplary application as follows:

The producers are synchronized to a system clock, system time is divided into frames which are further divided into slots, and a slot offset is assigned to each producer. For example, each frame is divided into 16 slots as illustrated in FIG. 14, the slot offsets 1–16 are distributed evenly among the various producers, and no more than 32 producers may be active in one channel. The maximum length of a transmission burst is 2 frame durations, or 32 slots. A producer may reduce its rate to comply with a new allocation grant immediately after its current transmission has finished, but it may increase its rate: 1) only at a slot whose number corresponds to the producer's assigned slot offset, and 2) only when two such slots have passed after the new allocation grant is received. In this way, it is ensured that no increases are performed until all ongoing transmissions have finished, thus guarding against data collisions. In this exemplary application, therefore, producers are forbidden to increase their rate until at least 32 slot durations after the update signal.

Figure 15:
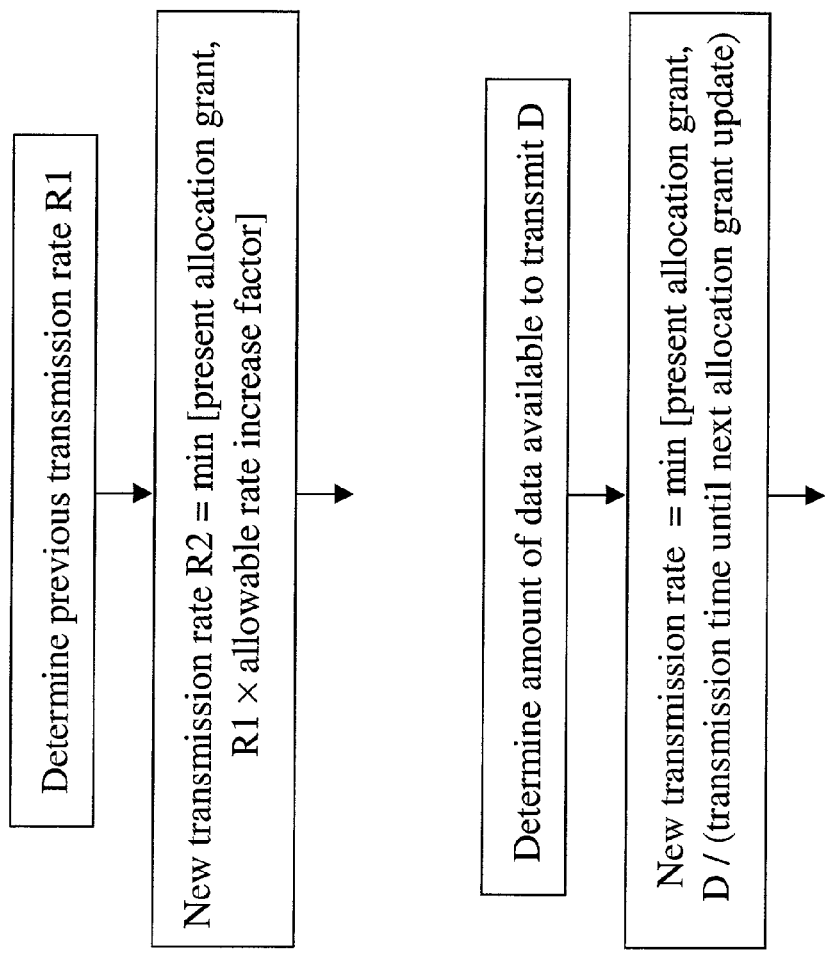
FIG. 15A is a flowchart for a method for restricting rate changes.
FIG. 15B is a flowchart for a method for restricting channel capacity usage.
Figure 16:
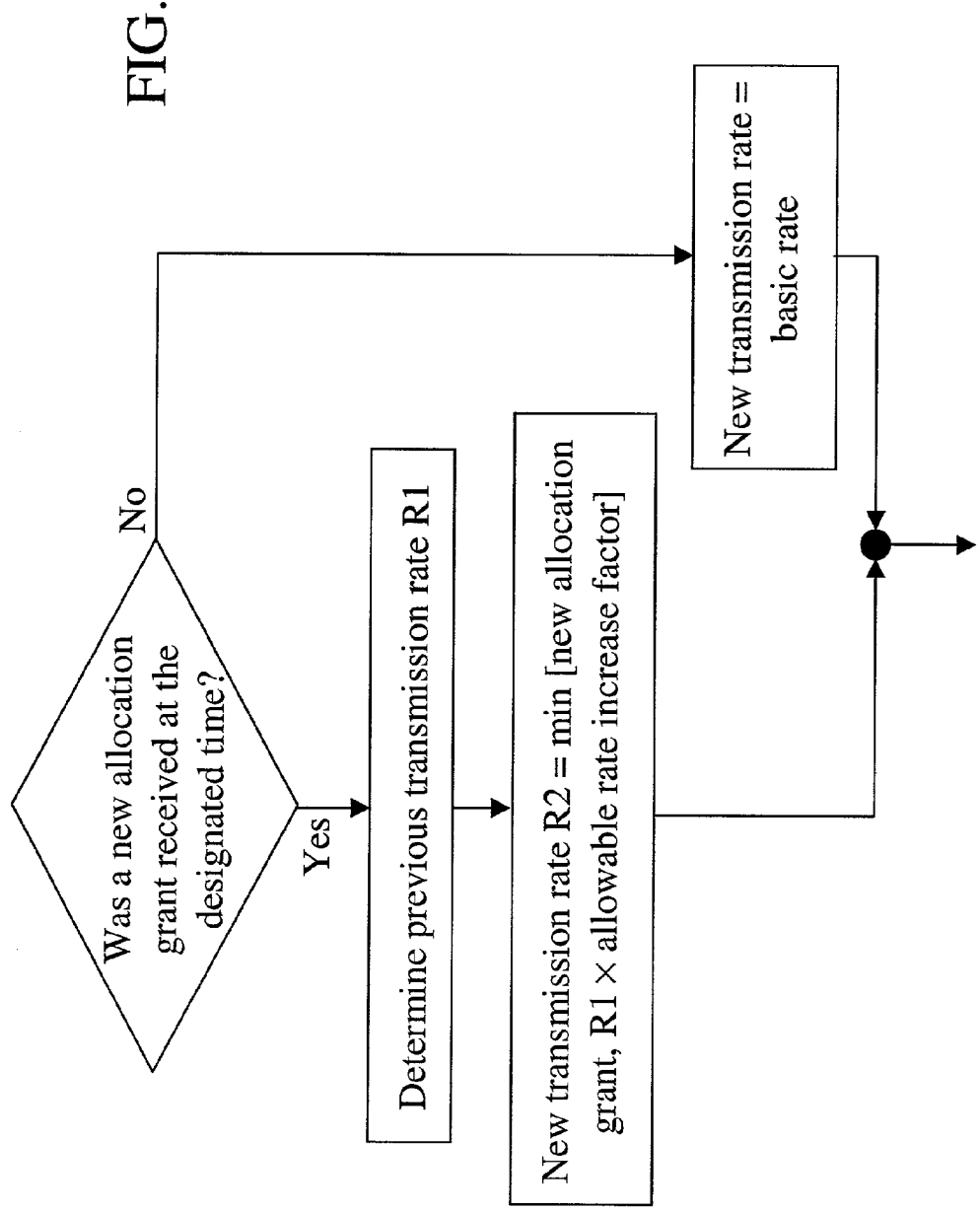
FIG. 16 is a flowchart for a method for receiving a new allocation grant that incorporates a restriction on rate changes.

For similar reasons, a 'slow-start' restriction may be imposed on the producers. This restriction requires any producer that is becoming active to begin transmitting at a low rate, regardless of its allocation grant. The starting rate may even be set to be lower than the basic rate. A similar restriction may be used to limit the extent to which a producer may increase its rate at any one time, regardless of how high its current allocation grant is. In CDMA applications, a power control mechanism is usually implemented whereby power in the channel is constantly adjusted to prevent collisions. Unless 'slow-start' and rate change restrictions are also imposed, however, a producer initiating a significant increase in transmission rate may corrupt the channel before the power control mechanism can compensate for the load, thus causing a collision and forcing a large amount of traffic to be retransmitted. In an exemplary implementation, a producer may not increase its rate by more than twice from one burst to the next. FIG. 15A shows a more generic example in which the current rate is limited to no more than the previous rate multiplied by a predetermined allowable rate increase factor, and FIG. 16 shows how this example may be combined into the method for receiving a new allocation grant illustrated in FIG. 12.

Figure 17:
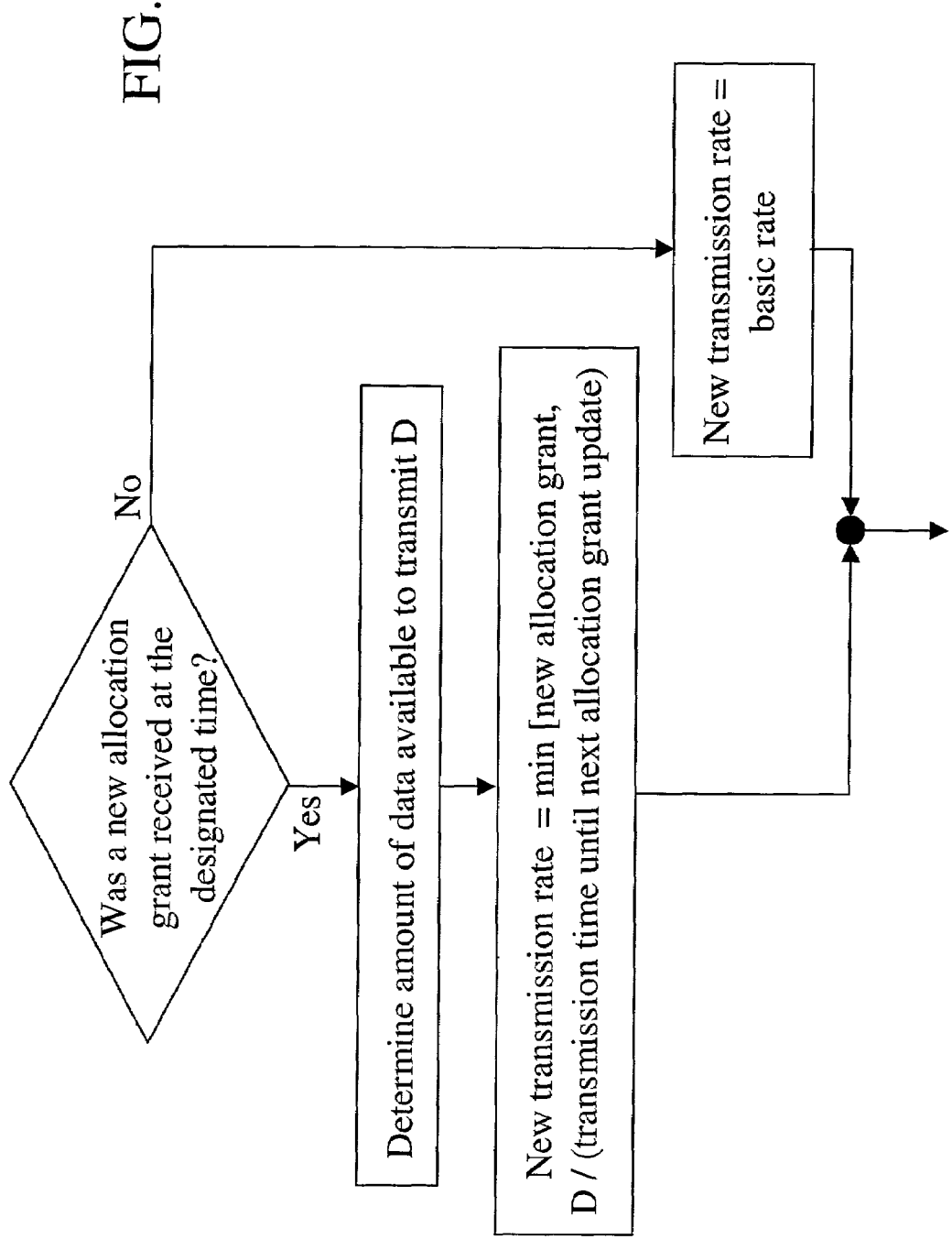
FIG. 17 is a flowchart for a method for receiving a new allocation grant that incorporates a restriction on channel capacity usage.

In order to provide the control unit with an accurate indication of each producer's requirements, a producer may be restricted to transmitting at a rate no higher than is justified by the data which is immediately available, regardless of that producer's current allocation grant. FIG. 15B shows an example of such a restriction, and FIG. 17 shows how this example may be combined into the method for receiving a new allocation grant illustrated in FIG. 12.

For ease of implementation, the structure of available rates may be designed to increment in powers of two. Because a doubling in rate requires a doubling in power to maintain the same ratio of energy per bit to noise power spectral density ($E_b/N_0$), each such rate step corresponds to a power step of 3 dB. In an exemplary application, the starting rate is set at 9600 bits/s, the basic rate is 19,200 bits/s, and the higher rates are 38,400, 76,800, 153,600, and 307,200 bits/s.

The foregoing description of the preferred embodiments is provided to enable any person skilled in the art to make or use the present invention. Various modifications to these embodiments will be readily apparent to those skilled in the art, and the generic principles presented herein may be applied to other embodiments without use of the inventive faculty. Thus, the present invention is not intended to be limited to the embodiments shown above but rather is to be accorded the widest scope consistent with the principles and novel features disclosed in any fashion herein.

I claim:

1. A method for allocating a capacity of a common channel among a plurality of data producers, the method comprising:

allocating to each of the plurality of producers a first portion of the capacity of the common channel and a second portion of the capacity of the common channel, the common channel being a reverse link of a wireless communication system, the first and second portions being data transmission rates, wherein the second portion of the capacity of the common channel allocated to each of the plurality of producers is based at least in part on the extent to which the corresponding producer is determined to have used the corresponding first portion of the capacity of the common channel.

2. The method for allocating a capacity of a common channel among a plurality of producers according to claim 1, wherein each of the first and second portions of the capacity of the common channel is at least a basic rate.

3. The method for allocating a capacity of a common channel among a plurality of producers according to claim 2, wherein frames of equal duration in time are divided into a number N of slots of equal duration, each slot of a frame being numbered in order of time from 1 to N, and each of the plurality of producers being assigned a number from 1 to N, wherein for each number i assigned to one of the plurality of producers, a moment at which a producer i commences producing has a fixed relation in time to the start of a slot having the number i.

4. The method for allocating a capacity of a common channel among a plurality of producers according to claim 3, wherein the common channel is the reverse link of a code-division multiple access system for wireless communications.

5. The method for allocating a capacity of a common channel among a plurality of producers according to claim 2, wherein the common channel is the reverse link of a code-division multiple access system for wireless communications.

6. The method for allocating a capacity of a common channel among a plurality of producers according to claim 1, wherein for each of the plurality of producers the corresponding second portion of the capacity of the common channel exceeds a basic rate only if the corresponding producer is determined to have used all of the corresponding first portion of the capacity of the common channel.

7. The method for allocating a capacity of a common channel among a plurality of producers according to claim 6, wherein a passing of time is divided into frames of equal length, each frame being further divided into a number N of slots of equal length being numbered in order of time from 1 to N, and each of the plurality of producers being assigned a number from 1 to N, wherein for each number i assigned to one of the plurality of producers, a moment at which a producer i commences producing has a fixed relation in time to the start of a slot having the number i.

8. The method for allocating a capacity of a common channel among a plurality of producers according to claim 7, wherein the common channel is the reverse link of a code-division multiple access system for wireless communications.

9. The method for allocating a capacity of a common channel among a plurality of producers according to claim 8, wherein each of said plurality of producers uses no more than a subportion of the corresponding second portion of the capacity of the common channel, said subportion not exceeding a corresponding used portion of the capacity of the common channel multiplied by an allowable rate increase factor, said corresponding used portion of the capacity of the common channel being a part of the corresponding first portion of the capacity of the common channel used by the corresponding one of said plurality of producers.

10. The method for allocating a capacity of a common channel among a plurality of producers according to claim 7, wherein each of said plurality of producers uses no more than a subportion of the corresponding second portion of the capacity of the common channel, said subportion not exceeding a corresponding used portion of the capacity of the common channel multiplied by an allowable rate increase factor, said corresponding used portion of the capacity of the common channel being a part of the corresponding first portion of the capacity of the common channel used by the corresponding one of said plurality of producers.

11. The method for allocating a capacity of a common channel among a plurality of producers according to claim 6, wherein the common channel is the reverse link of a code-division multiple access system for wireless communications.

12. The method for allocating a capacity of a common channel among a plurality of producers according to claim 1, wherein for each producer that is determined to have used all of the corresponding first portion of the capacity of the common channel, the corresponding second portion of the capacity of the common channel is at least a basic rate, and
wherein for each producer that is determined to have used a portion less than all of the corresponding first portion of the capacity of the common channel, the corresponding second portion of the capacity of the common channel is at least a subbasic rate, the subbasic rate being less than the basic rate.

13. The method for allocating a capacity of a common channel among a plurality of producers according to claim 12, the subbasic rate being a null rate.

14. The method for allocating a capacity of a common channel among a plurality of producers according to claim 12, the subbasic rate being a null rate if the basic rate is greater than the capacity of the common channel divided by the number of the plurality of producers.

15. The method for allocating a capacity of a common channel among a plurality of producers according to claim 1, the plurality of producers being divided into a first group and a second group,
wherein for each of the plurality of producers in the first group, each of the first and second portions of the capacity of the common channel is at least a first basic rate, and
wherein for each of the plurality of producers in the second group, each of the first and second portions of the capacity of the common channel is at least a second basic rate, the second basic rate being less than the first basic rate.

16. The method for allocating a capacity of a common channel among a plurality of producers according to claim 15, the second basic rate being a null rate.

17. The method for allocating a capacity of a common channel among a plurality of producers according to claim 1, a passing of time being divided into frames of equal length, each frame being further divided into a number N of slots of equal length being numbered in order of time from 1 to N, and each of the plurality of producers being assigned a number from 1 to N,
wherein for each number i assigned to one of the plurality of producers, a moment at which a producer i commences producing has a fixed relation in time to the start of a slot having the number i.

18. The method for allocating a capacity of a common channel among a plurality of producers according to claim 1, wherein the common channel is the reverse link of a multiple access system for wireless communications.

19. The method for allocating a capacity of a common channel among a plurality of producers according to claim 18, wherein the common channel is the reverse link of a code-division multiple access system for wireless communications.

20. The method for allocating a capacity of a common channel among a plurality of producers according to claim 1, wherein each of said plurality of producers has an amount of data to be produced and uses no more than a subportion of the corresponding second portion of the capacity of the common channel, said subportion being based on the amount of data to be produced.

21. A control unit operable to:
issue an allocation grant to allocate a first data transmission rate of a common reverse channel of a wireless communication system to each of a plurality of data producers; and
allocating a second data transmission rate of the common channel to each of the plurality of producers,
wherein the second data transmission rate of the common channel allocated to each of the plurality of producers is based at least in part on the extent to which a corresponding producer is determined to have used a corresponding first data transmission rate of the common channel.

22. An apparatus for allocating a capacity of a common channel among a plurality of producers, the common channel being a reverse link of a wireless communication system, the apparatus comprising:
means for allocating a first portion of the capacity of the common channel to each of the plurality of producers; and
means for allocating a second portion of the capacity of the common channel to each of the plurality of producers, the first and second portions being data transmission rates,
wherein the second portion of the capacity of the common channel allocated to each of the plurality of producers is based at least in part on the extent to which a corresponding producer is determined to have used a corresponding first portion of the capacity of the common channel.

23. A computer readable medium embodying a method for allocating a capacity of a common channel among a plurality of producers, the common channel being a reverse link of a wireless communication system, the method comprising:
allocating a first portion of the capacity of the common channel to each of the plurality of producers; and
allocating a second portion of the capacity of the common channel to each of the plurality of producers, the first and second portions being data transmission rates,
wherein the second portion of the capacity of the common channel allocated to each of the plurality of producers is based at least in part on the extent to which a corresponding producer is determined to have used a corresponding first portion of the capacity of the common channel.

* * * * *